United States Patent [19]
Vangen

[11] Patent Number: 4,712,509
[45] Date of Patent: Dec. 15, 1987

[54] ENCLOSURE CONSTRUCTIONS FOR FISH BREEDING

[76] Inventor: Knut Vangen, Bekkjarvikvn. 19, N-5084 Tertnes, Norway

[21] Appl. No.: 696,767

[22] Filed: Jan. 31, 1985

[30] Foreign Application Priority Data

Feb. 1, 1984 [NO] Norway ............................ 840376

[51] Int. Cl.$^4$ ............................................. A01K 61/00
[52] U.S. Cl. ............................................. 119/3; 119/5
[58] Field of Search ................. 119/3, 5; 405/71, 72, 405/70, 218, 219, 220; 441/35, 43, 44, 45, 46, 54

[56] References Cited

U.S. PATENT DOCUMENTS

| | | | |
|---|---|---|---|
| 3,698,359 | 10/1972 | Fremont | 119/3 |
| 3,726,098 | 4/1973 | Alms et al. | 405/219 |
| 4,505,619 | 3/1985 | Sargent | 405/218 |

FOREIGN PATENT DOCUMENTS 0789065 12/1980 U.S.S.R. .................................. 119/3

Primary Examiner—John J. Wilson

Attorney, Agent, or Firm—Kenyon & Kenyon

[57] ABSTRACT

An enclosure construction for fish breeding which comprises two rows of rectangular fish enclosure frames (10) coupled together, which are each constructed of longitudinal and transverse frame members (11–14) and mutually connected to each other via horizontal pivot bearings by way of certain of the frame members which are common to two or more frames (10). A central longitudinal frame member (11) which is common to frames (10) adjoining in pairs is connected at the ends to a joint point-forming frame member (14) which in addition to fastening the central longitudinal frame member or a pair of central, longitudinal frame members (11) also forms a fastening for transverse frame members (13) at a distance outside the central, longitudinal frame member (11). The joint point-forming frame member (14) is in addition to being fastened to the central, longitudinal frame member (11) via a horizontal pivot bearing connected to the central, longitudinal frame member (11) lock at the outer end of a framework (22) at a distance laterally outside length sides of the joint point-forming frame member (14).

7 Claims, 8 Drawing Figures

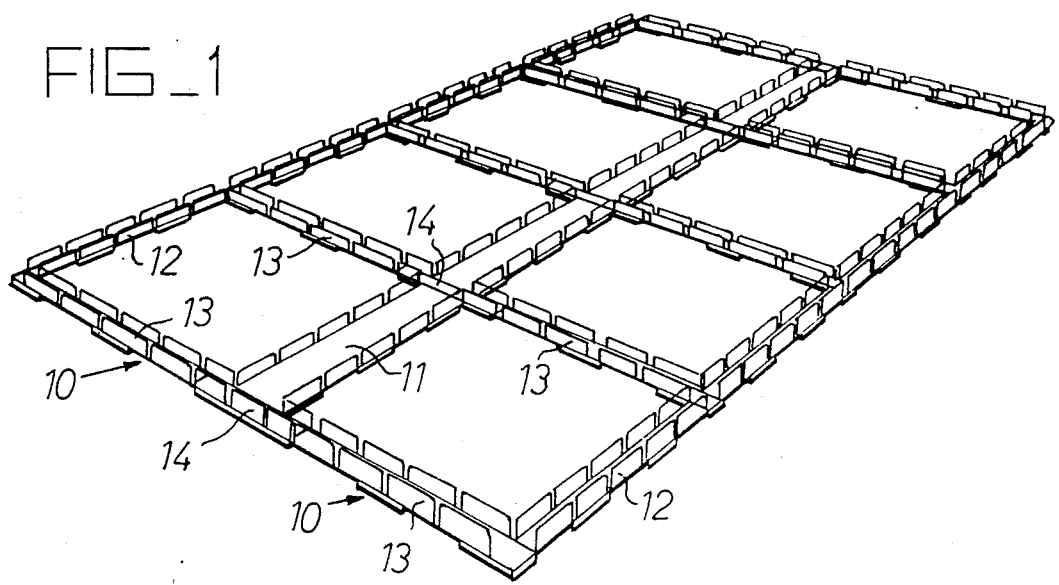
FIG_1
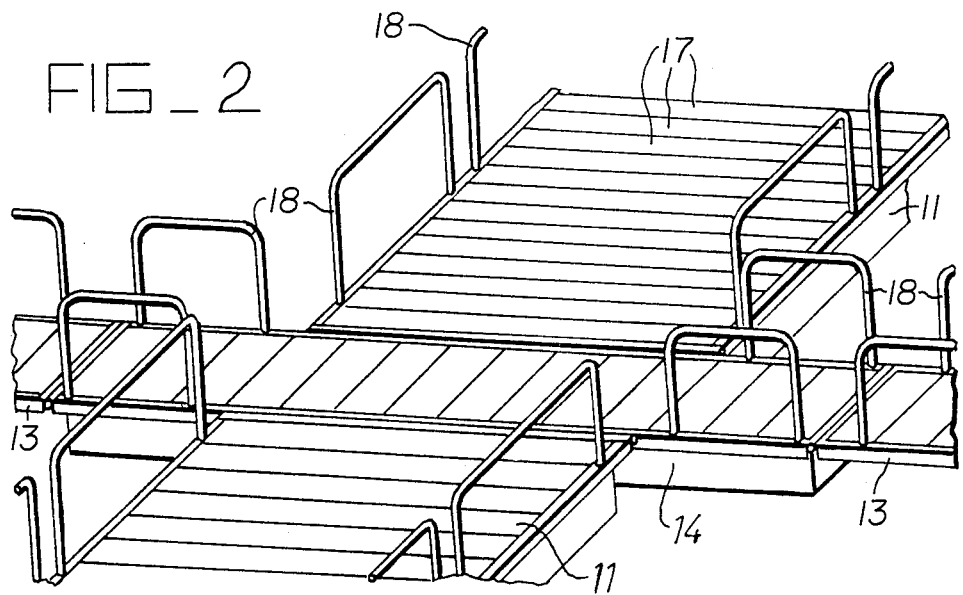
FIG_2

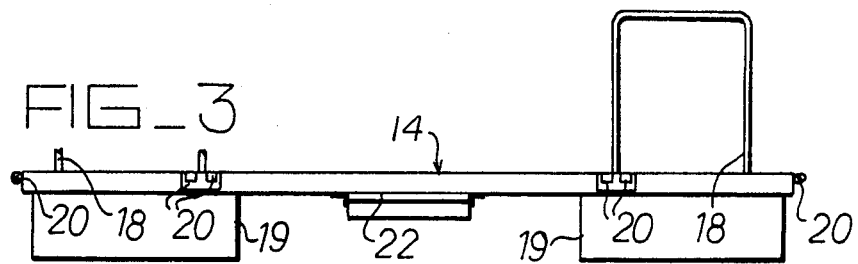
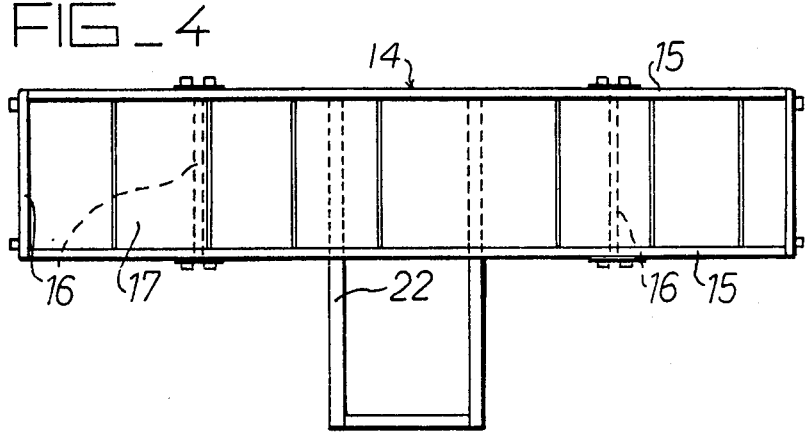
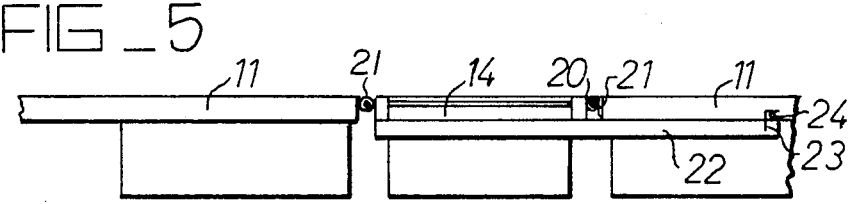
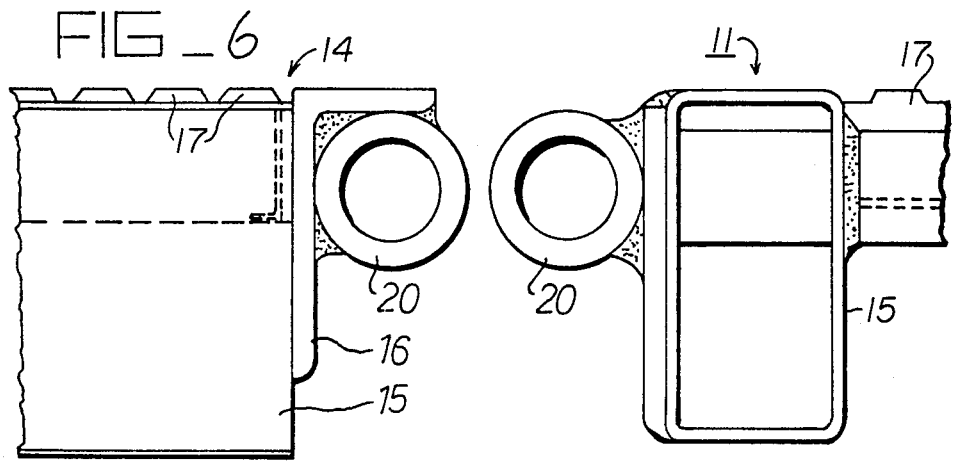

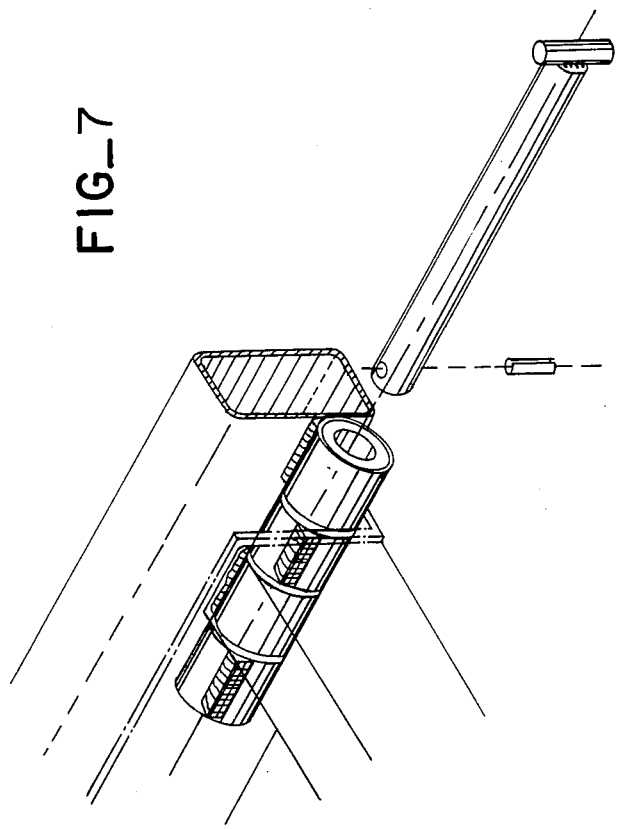
FIG_7

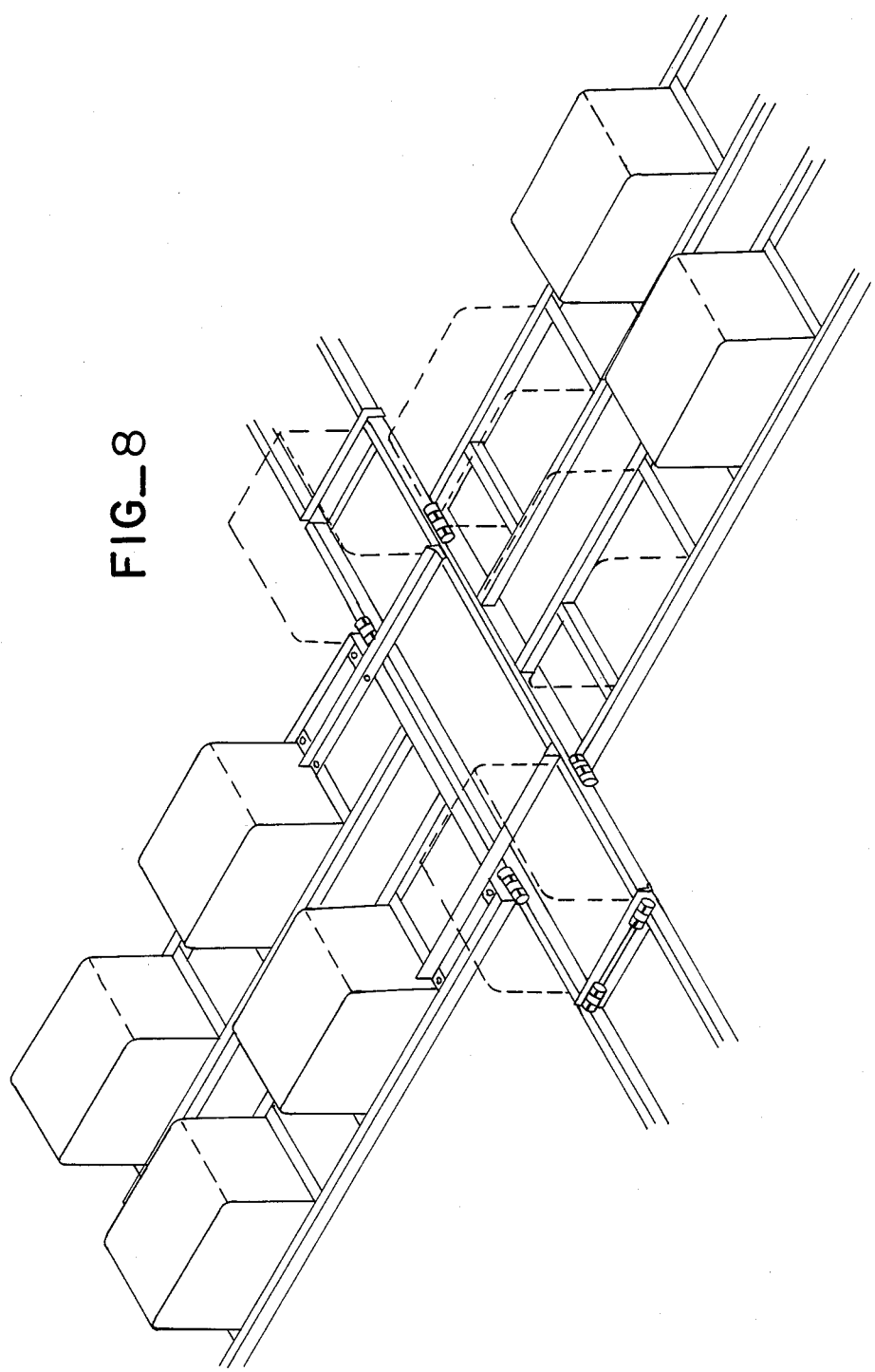
FIG_8

ENCLOSURE CONSTRUCTIONS FOR FISH BREEDING

This invention relates to enclosure constructions for fish breeding. It is an object of the present invention to provide a enclosure construction where there is a possibility of stabilizing the construction in a relatively simple manner so as to prevent severe movements of certain vital components of the construction.

Accordingly, the present invention resides in an enclosure construction for fish breeding which comprises a plurality of longitudinal frame members, a plurality of transverse frame members which are hingedly coupled with the transverse frame members to define at least two rows of rectangular frames and a plurality of junction forming frame members each of which is pivotally connected between and to a pair of aligned transverse frame members and pivotally connected between and to a pair of aligned longitudinal frame members. In addition, a framework is secured to and extends from each junction forming frame member to a point under an adjacent longitudinal frame member and means are provided for securing each framework to the adjacent longitudinal frame member in order to laterally stabilize this adjacent longitudinal frame member.

Where the enclosure construction forms two rows of rectangular frames, use is made of three rows of longitudinal frame members and five rows of transverse frame members. In this embodiment, the central longitudinal frame members are common to each row of rectangular frames.

The longitudinal and transverse frame members are hingedly coupled to each other, for example by horizontal pivot means.

In order that the invention can be more clearly understood, a preferred embodiment thereof will now be described, by way of example, with reference to the accompanying drawing in which:

FIG. 1 is a perspective view of an enclosure construction for fish breeding,

FIG. 2 is a perspective view of a portion of FIG. 1 shown on a larger scale,

FIGS. 3 and 4 are side and plan views respectively of a main component of the enclosure construction of FIG. 1.

FIG. 5 is a fragmentary side view of three cooperating components of the enclosure construction when coupled together, FIG. 6 is a fragmentary view of end portions of two components which are to be jointed together in a joint connection, FIG. 7 illustrates an enlarged detail of a joint connection; and FIG. 8 illustrates a view of an underside of the enclosure construction at a junction point.

Referring to FIG. 1, an enclosure construction is illustrated which is made up of eight enclosure frames 10 in a coherent unit, that is to say two parallel rows each of four frames. Each frame 10 consists of an inner, first longitudial, relatively broad frame member 11 which is common to two frames adjoining in pairs, an outer, second longitudinal, relatively narrow frame member 12, two opposite, laterally extending, relatively narrow frame members 13 which can form outer frame members or common frame members for two frames in a longitudinal row, and two opposite, relatively narrow and short function-forming frame members 14 which form connecting elements between the frame members 11 in the longitudinal direction of the enclosure construction and between the frame members 13 in the transverse direction of that construction.

Each frame member 11-14 is constructed in a similar manner having a framework of longitudinal channel profiles 15 and transverse angle profiles 16 as indicated in FIGS. 4 and 6. Panels 17 of expanded metal are fastened to the top of the framework of each frame member 11-14 along with hand rail-forming hoops 18. In addition, a plurality of pontoons 19 are secured to the underside of each framework of a frame member 11-14.

The frame members are connected to each other by means of endways or laterally outwardly projecting pivot bearings 20 and—as indicated in FIGS. 5, 6 and 7—associated pivot bolts 21.

The frame member 14 constitutes a main component of the enclosure construction since it forms, in part, a junction point between three or more adjacent frame members and serves, in part, as a stabilizing member for the enclosure construction.

Referring to FIGS. 3, 4 and 8 the frame member 14 is provided with a framework 22 projecting laterally outwards which is secured to the under side of the main frame of the frame member 14. The framework 22 projects laterally outwards from the joint-forming frame member 14 by a distance which is less than the breadth (width) of the central, longitudinal frame member 11 and which corresponds approximately to the breadth of the joint-forming frame member 14. The framework 22 has a breadth (that is to say the dimension in the longitudinal direction of the frame member 14) which is less than the breadth of the central, longitudinal frame member 11.

By means of an angle member 23 on the outer end of the laterally directed framework 22 of the frame member 14 and a lock bolt 24 on the adjacent end of the frame member 11, the frame member 11 is locked to the frame member 14. By means of the framework 22 the frame member 11 can be supported with a certain, but greatly restricted possibility for movement on the frame member 14 relative to the joint connection between the frame members 14 and 11.

Provision is made for the frame member 14 to have a larger length than the breadth of the frame member 11 so that the frame member 14 projects a distance laterally outside the frame member 11 on its opposite sides. As a result of its connection with the frame member 14, the frame member 11 achieves a certain lateral stability under loads from the frame members 12 laterally outside the length sides of the frame member 11.

I claim:

1. An enclosure construction for fish breeding comprising
   a plurality of longitudinal frame members;
   a plurality of transverse frame members hingedly coupled with said longitudinal frame members to define at least two rows of rectangular frames;
   a plurality of junction-forming frame members, each said junction forming frame member being pivotally connected between and to a pair of aligned transverse frame members and pivotally connected between and to a pair of aligned longitudinal frame members;
   a plurality of frameworks, each said framework being secured to and extending from a respective junction-forming frame member to a point under an adjacent longitudinal frame member; and means securing each framework to said adjacent longitudinal frame member to laterally stabilize said adjacent longitudinal frame member.

2. An enclosure construction as set forth in claim 1 wherein each means includes an angle member on an outer end of a respective framework and a lock bolt on said adjacent longitudinal frame member secured to said angle member.

3. An enclosure construction as set forth in claim 1 wherein each framework is of a width less than said adjacent longitudinal frame member.

4. An enclosure construction as set forth in claim 3 wherein each framework projects from a respective junction-forming frame member a distance less than the width of said adjacent longitudinal frame member.

5. An enclosure construction as set forth in claim 1 wherein each framework projects from a respective junction-forming frame member a distance less than the width of said adjacent longitudinal frame member.

6. An enclosure construction as set forth in claim 1 wherein each frame member includes panels of metal and hand rail-forming hoops.

7. An enclosure construction as set forth in claim 1 wherein each frame member has a plurality of pontoons secured to an underside.

* * * * *

UNITED STATES PATENT AND TRADEMARK OFFICE
CERTIFICATE OF CORRECTION

PATENT NO. : 4,712,509

DATED : December 15, 1987

INVENTOR(S) : Knut Vangen

It is certified that error appears in the above-identified patent and that said Letters Patent is hereby corrected as shown below:

```
In the Abstract, line 19 cancel "lock"
Column 1, line 7 "a enclosure" should be -an enclosure
Column 1, line 68 "function-" should be -junction-
Column 4, line 10 "claim 1" should be --claim 6-
```

Signed and Sealed this

Nineteenth Day of July, 1988

Attest:

DONALD J. QUIGG

*Attesting Officer*  *Commissioner of Patents and Trademarks*